United States Patent
Koch

(10) Patent No.: US 9,955,780 B2
(45) Date of Patent: May 1, 2018

(54) OPERATING DEVICE FOR AN ELECTRICALLY HEIGHT-ADJUSTABLE TABLE, DRIVE SYSTEM AND METHOD FOR ADJUSTING THE HEIGHT OF A TABLETOP OF THE TABLE

(71) Applicant: LOGICDATA Electronic & Software Entwicklungs GmbH, Deutschlandsberg (AT)

(72) Inventor: Walter Koch, Schwanberg (AT)

(73) Assignee: LOGICDATA ELECTRONIC & SOFTWARE ENTWICKLUNGS GMBH, Deutschlandsberg (AT)

( * ) Notice: Subject to any disclaimer, the term of this patent is extended or adjusted under 35 U.S.C. 154(b) by 315 days.

(21) Appl. No.: 14/779,329

(22) PCT Filed: Mar. 13, 2014

(86) PCT No.: PCT/EP2014/054934
§ 371 (c)(1),
(2) Date: Sep. 22, 2015

(87) PCT Pub. No.: WO2014/146963
PCT Pub. Date: Sep. 25, 2014

(65) Prior Publication Data
US 2016/0051042 A1    Feb. 25, 2016

(30) Foreign Application Priority Data

Mar. 22, 2013 (DE) .......................... 10 2013 102 956
Jul. 4, 2013 (DE) .......................... 10 2013 107 053

(51) Int. Cl.
*A47B 9/00* (2006.01)
*F16M 11/18* (2006.01)
(Continued)

(52) U.S. Cl.
CPC ............... *A47B 9/00* (2013.01); *F16M 11/18* (2013.01); *H02K 11/0042* (2013.01);
(Continued)

(58) Field of Classification Search
CPC .. A47B 9/00; A47B 2200/0056; F16M 11/18; H02K 11/0042; H02K 11/0089; H02P 29/00
(Continued)

(56) References Cited

U.S. PATENT DOCUMENTS 5,112,019 A * 5/1992 Metzler ............... A61M 3/0241
248/125.2
5,259,326 A * 11/1993 Borgman ................. A47B 9/00
108/147

(Continued)

FOREIGN PATENT DOCUMENTS

CA         2350134 A1 *  6/2001 ............... F16B 1/00
DE     102006008505 A1    8/2007
(Continued)

*Primary Examiner* — Gwendolyn W Baxter
(74) *Attorney, Agent, or Firm* — McDermott Will & Emery LLP

(57) ABSTRACT

An operating device is proposed for an electrically height-adjustable table having at least one electrical drive (EA) for adjusting the height of a table top (TP) of the table, and a controller (CTRL) for controlling the drive (EA). The operating device has an actuating element (BE, EMS, CS) to be arranged in the region of the table top (TP), a force sensor (FS), which is designed to measure a force acting on the table top (TP), and an evaluation circuit (EV). This circuit is designed to detect an actuation of the actuating element (BE, EMS, CS) during a height adjustment of the table top (TP), to receive measurement values from the force sensor (FS) within a predetermined period of time after the detected actuation, to determine a force alteration value from the received measurement values, and if the force alteration
(Continued)

Figure 1:
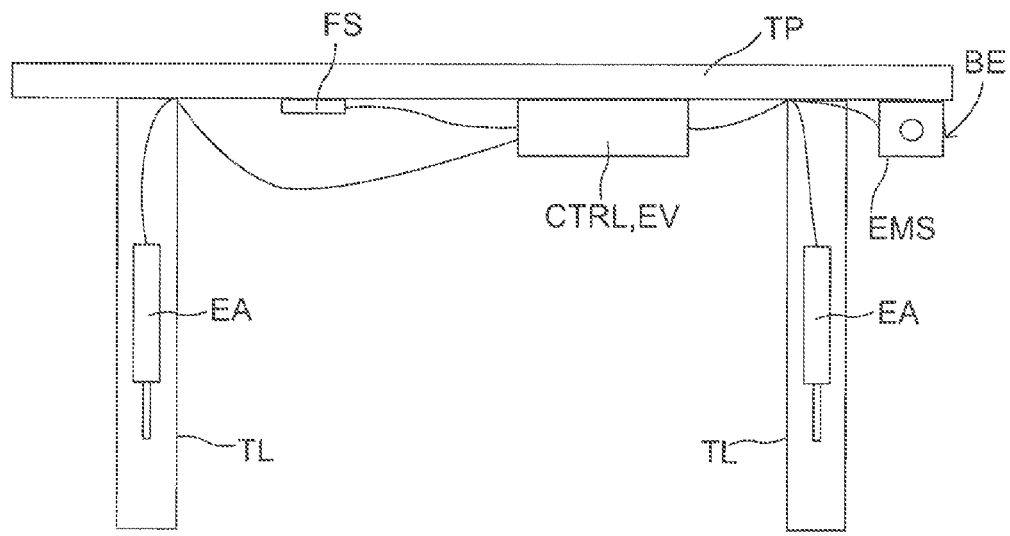

value is greater than a threshold value, to issue a control signal to the controller (CTRL) in order to initiate a height adjustment of the tabletop (TP) in a direction, depending on a sign of the force alteration value.

20 Claims, 5 Drawing Sheets

(51) Int. Cl.
  *H02K 11/00* (2016.01)
  *H02P 29/00* (2016.01)
(52) U.S. Cl.
  CPC .......... *H02K 11/0089* (2013.01); *H02P 29/00* (2013.01); *A47B 2200/0056* (2013.01)
(58) Field of Classification Search
  USPC ........................................................ 248/550
  See application file for complete search history.

(56) References Cited

U.S. PATENT DOCUMENTS

| | | | | |
|---|---|---|---|---|
| 6,209,841 B1 * | 4/2001 | Houghton, Jr. | ......... | F16F 13/00 |
| | | | | 188/378 |
| 2014/0020606 A1 * | 1/2014 | Benden | ................. | A47B 13/00 |
| | | | | 108/50.14 |

FOREIGN PATENT DOCUMENTS

| | | | | |
|---|---|---|---|---|
| DE | 202011003743 U1 | 5/2011 | | |
| DE | 102011050161 A1 | 11/2011 | | |
| DE | 102012101890 A1 | 9/2013 | | |
| DE | 102014117590 A1 * | 6/2016 | ............. | H01R 12/67 |
| EP | 0922410 A2 * | 6/1999 | ............... | A47B 9/00 |
| EP | 1470766 A1 | 10/2004 | | |
| EP | 2497386 A1 | 9/2012 | | |
| WO | 03/056976 A1 | 7/2003 | | |
| WO | 20091146709 A2 | 12/2009 | | |
| WO | WO2010054656 * | 5/2010 | ............. | A47C 20/04 |

* cited by examiner

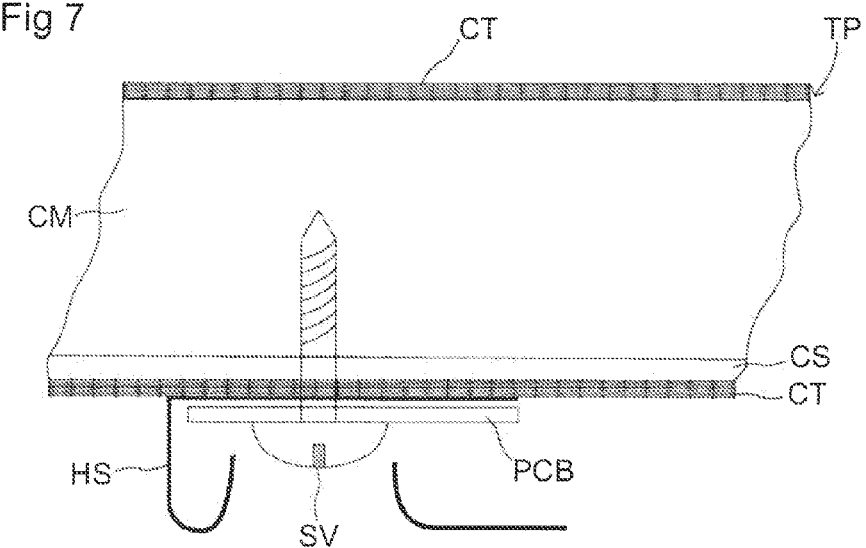
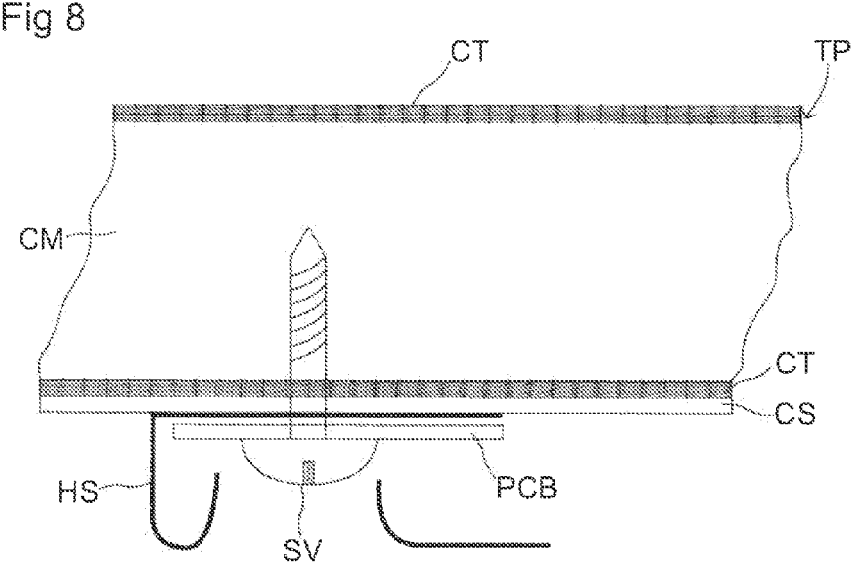

OPERATING DEVICE FOR AN ELECTRICALLY HEIGHT-ADJUSTABLE TABLE, DRIVE SYSTEM AND METHOD FOR ADJUSTING THE HEIGHT OF A TABLETOP OF THE TABLE

The invention relates to an operating device for an electrically height-adjustable table, to an electrically height-adjustable table, and to a drive system for an electrically height-adjustable table. The invention further relates to a method for adjusting the height of a tabletop of a table.

Electrically adjustable furniture is being offered for sale more and more often. Thus the height of the tabletop for many types of tables, especially desks, can be adjusted electrically via a special drive.

In conventional height-adjustable tables, the height adjustment is operated via switches on a manual operating part, or via operating elements mounted on the table, respectively for an upward or downward movement of the tabletop. Such operating elements or manual operating parts are difficult to integrate visually into the design of the table.

One problem to be solved is to specify an improved concept for operating an electrically height-adjustable table.

This problem is solved with the subject matter of the independent claims. Refinements and configurations are the subject matter of the dependent claims.

For example, the improved operating concept may be based on the idea of forgoing actuating elements fixedly assigned to one direction of motion. An operating element according to the improved concept relies instead on a simple actuating element such as an electromechanical switch or a touch-sensitive switching area as well as a force sensor, which is designed to measure a force acting on the tabletop. When the simple actuating element is actuated, measurement values from the force sensor can be evaluated to determine whether a user of the table is exerting force in one direction onto the table or the tabletop, in addition to actuating the actuating element. For example, if the tabletop is being pulled upward in a defined period of time after the detected actuation, an upward movement of the table can be initiated due to the change in force. In the same manner, a downward movement of the tabletop can be initiated if there is a corresponding pressure on the tabletop. Thus a simple operation of the height adjustment for the table with visually scarcely perceptible actuating elements can be realized, particularly with a touch sensitive switching area.

In an exemplary embodiment according to the improved operating concept, an operating device for an electrically height-adjustable table having at least one electrical drive for adjusting the height of a tabletop of the table and a controller for controlling the drive comprises an actuating element arranged in the tabletop region, a force sensor that is designed to measure a force acting on the tabletop, and an evaluation circuit. The evaluation circuit is designed to detect an actuation of the actuating element while the height adjustment of the tabletop is blocked, more particularly mechanically blocked. The evaluation circuit is further intended to receive measurement values from the force sensor in a predetermined period of time after the detected actuation and to determine a force alteration value, in particular an absolute alteration of force and/or a force gradient, from the received measurement values. If the force alteration value is greater than a threshold value, the evaluation circuit outputs a control signal to the controller that initiates a height adjustment of the tabletop in one direction. The direction depends on a sign of the force alteration value.

The force alteration value can be determined, for example, by determining a reference force value, which corresponds to a quiescent load on the table for example, before the detection of the actuation of the actuation element. The force alteration value then results in relation to this reference force value.

As indicated, the height adjustment is initiated if a force alteration value exceeding the threshold value results within the predetermined period of time after the detection. The height adjustment can theoretically be continued as long as desired, but is limited in practical terms, merely by a stop of the tabletop movement upward or downward, so long as certain other conditions for the force alteration value are satisfied. For example, the movement can be continued so long as the force alteration value is greater than the threshold value. The continuation of the height adjustment can additionally be made dependent on a status of the actuating element.

In the various embodiments of the operating device, the evaluation circuit is designed to output the control signal for adjusting the height only as long as an actuation of the operating element is detected. Thus the height adjustment can easily be ended even if force is being applied.

The evaluation circuit is designed in some embodiments to output the control signal along with speed information for the height adjustment, for example. The speed information depends on a magnitude of the force measured by the force sensor. In particular, the speed for the height adjustment can be adjusted, depending on the force applied to the tabletop, within a predetermined framework of a minimum speed and a maximum speed. The speed or the speed information can preferably vary during a process of a height adjustment, if the measured force during the height adjustment changes.

For example, the force sensor in the various embodiments of the operating device can be designed to measure a force acting between the drive and the tabletop. In various embodiments, the force sensor comprises at least one of the following: a strain gage provided for attachment to the tabletop, a strain gage provided for attachment to or in a part of the table supporting the tabletop, a pressure sensor, preferably a piezoelectric-based sensor provided for attachment to or in a part of the table supporting the tabletop, or a force-dependent resistor.

As already indicated, a detection of the actuation of the actuating element is blocked during a height adjustment of the table. In various embodiments, no electric power is supplied to a motor of the drive during such a blocking of the height adjustment. Instead of that, mechanical blocking by means of a mechanical brake, a retaining element or the like can be performed, for example. It is likewise possible that the height adjustment exists solely by a self-locking of the electrical drive if the drive is not being supplied with current or voltage.

In alternative embodiments, the height adjustment can also be blocked by supplying electrical power to a motor of the drive. In such a design, for example, it would be moved solely by the forces acting on the table without supply of electrical power, so that the height adjusts itself downward so to speak, due to specially selected self-locking of the drive for example. By supplying electric power, however, the tabletop is held suspended with appropriate regulation, so that no height adjustment takes place even if a force acts on the tabletop.

In order to clearly signal to the user that a height adjustment can be initiated by raising or pressing on the tabletop, various embodiments of the operating device provide corresponding signaling means, which indicate the detected actuation of the actuation element. The signaling can be visual, e.g. by means of a light element or a light rod mounted in or on the tabletop. Alternatively or additionally, the signaling can also be acoustic. Such a signaling can also be correspondingly triggered by the evaluation circuit.

In special embodiments of the operating device, it further comprises an additional actuating element to be arranged in the tabletop region, the evaluation circuit being further designed to initiate a height adjustment of the tabletop only if an actuation of both actuating elements is detected during the blocking of the height adjustment of the tabletop. Security in relation to an undesired height adjustment of the table top is further increased by the dependence on the actuation of two actuating elements. In various embodiments, the actuating element or elements comprise an electromechanical switch, which can be designed as a film switch for example.

In alternative embodiments, the actuating element or elements comprise a touch-sensitive sensor, particularly a capacitive sensor. Such a sensor is capable of detecting the contact or proximity of the user's hand, for example, and determining actuation accordingly.

The touch-sensitive sensor is formed, for example, by a conductive surface, which is produced, in particular, from a conductive paint.

An operating device according to one of the previously described embodiments can be used for various types of electrically adjustable tables that have the at least one electrical drive and the controller for controlling the drive.

In a special embodiment, such an electrically adjustable table comprises an embodiment of the operating device in which the actuating element comprises a test sensitive sensor formed by a conductive surface. This conductive surface is arranged on a surface of the tabletop or underneath a coating of the tabletop. For a solid tabletop, for example, the conductive surface can be applied directly to the surface of the tabletop that does not have a coating, by gluing a conductive film or by applying electrically conductive paint for example. Such an arrangement is also possible for coated tabletops, wherein the conductive surface is applied to the coating.

Such a coating can be formed from plastic or veneer. For coated tabletops, it is also possible to arrange the conductive surface, which again is formed from a conductive plate or film or a conductive paint, underneath the coating or between the core and the coating. In particular, the provision of the actuating element is not visible to the viewer of the table, so that this sensor system fits better into the appearance of the table.

It goes without saying that the tabletop can also be equipped with multiple actuating elements or touch-sensitive elements, as described above, in order to allow the actuation to be dependent on both actuating elements.

The conductive surface is preferably arranged on a side of the table top facing the floor. Firstly, this preserves or improves the visual impression of the tabletop, and secondly a load on the conductive surface is achieved by the arrangement on the unloaded side of the table top.

In addition, the conductive surface or surfaces are preferably arranged outside the working area of the tabletop or an area for sitting at the tabletop. For example, conductive surfaces are provided only on a right-hand or left-hand edge of the tabletop, as viewed by a user, so that an unintended actuation of the actuating element during normal working on the tabletop can be prevented or largely prevented.

In various designs of such a table, the evaluation circuit is connected to the tabletop via a screw connection. An electrical connection between the evaluation circuit and the conductive surface is established via the screw connection, in particular exclusively thereby. In other words, such an arrangement is free of other electrical connections between the evaluation circuit and the conductive surface outside the screw connection.

An operating device according to one of the previously described embodiments can also be used in the drive system for an electrically height-adjustable table. Such a drive system according to the improved operating concept comprises, for example, an operating device according to one of the previously described embodiments, the at least one electrical drive for adjusting the height of the tabletop of the table, and the controller for controlling the drive. The drive has a motor electronics unit, which comprises the controller and the evaluation device and is arranged on a motor of the drive.

Thereby it is possible to forgo provision of the controller and the evaluation circuit directly on the tabletop. It is instead sufficient to provide the corresponding sensor system, i.e. the actuating element and the force sensor or sensors, on the tabletop and to establish an electrical connection to the motor electronics unit. This makes it possible to achieve a better integration of such a drive system into a table or a table system, which is in particular less visually apparent to a viewer or a user of the table.

In such a drive system, the motor electronics unit, the actuating element and the force sensor are interconnected via a bus system. Such a bus system thus allows a modular construction of the drive system in a simplified manner.

For example, the motor electronics unit may comprise a correspondingly programmed microcontroller or the like, which preferably takes on both the controlling of the drives and the evaluation of the sensor signals, i.e. the function of the evaluation circuit.

According to the improved operating concept, a method for adjusting the height of the table top of a table can be specified. Corresponding to the above discussions, such a table has an actuating element arranged in a region of the tabletop, as well as a force sensor that is designed to measure a force acting on the tabletop. An actuation of the actuating element is detected while a height adjustment of the tabletop is blocked, more particularly mechanically blocked. Measurement values from the force sensor are received in a predetermined period of time after the detected actuation. The force alteration value, in particular an absolute force alteration or a force gradient, is determined from the received measurement values. If the force alteration value is greater than a threshold value, the height adjustment of the table top is performed in a direction that depends on a sign of the force alteration value.

For example, no electrical power is supplied to a motor of the drive during such a blocking of the height adjustment. Alternatively, the height adjustment can be blocked by supplying electrical power to a motor of the drive. The reader is referred in this respect to the discussion above relating to the operating device.

The height adjustment is preferably only carried out so long as actuation of the actuating element is detected. Further configurations of the method follow directly from the previously described embodiments of the operating device, the table and the drive system.

The invention will be described in detail below for several embodiments with reference to figures. Identical reference numbers designate elements or components with identical functions. Insofar as circuit parts or components correspond to one another in function, a description thereof will not be repeated in each of the following figures.

Figure 2:
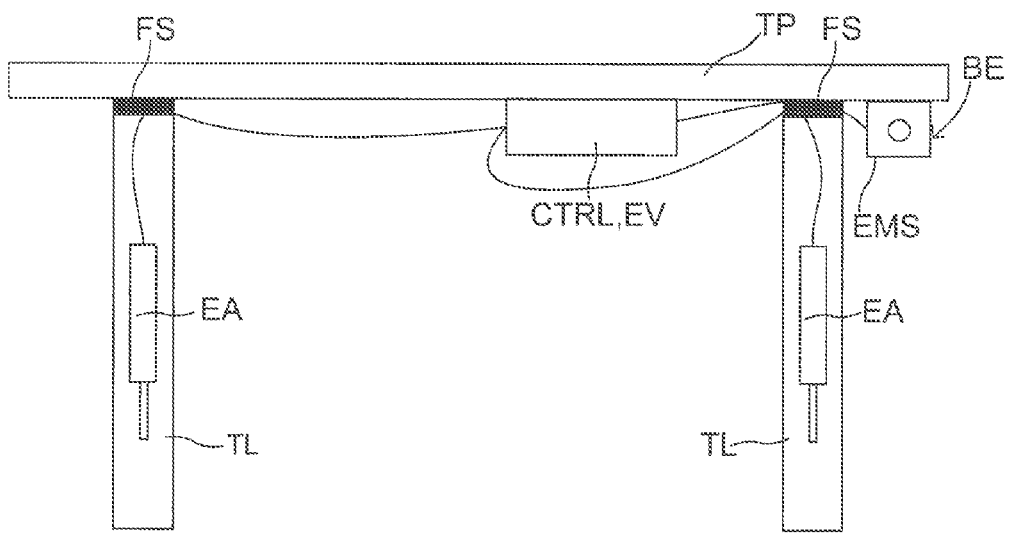
Figure 3:
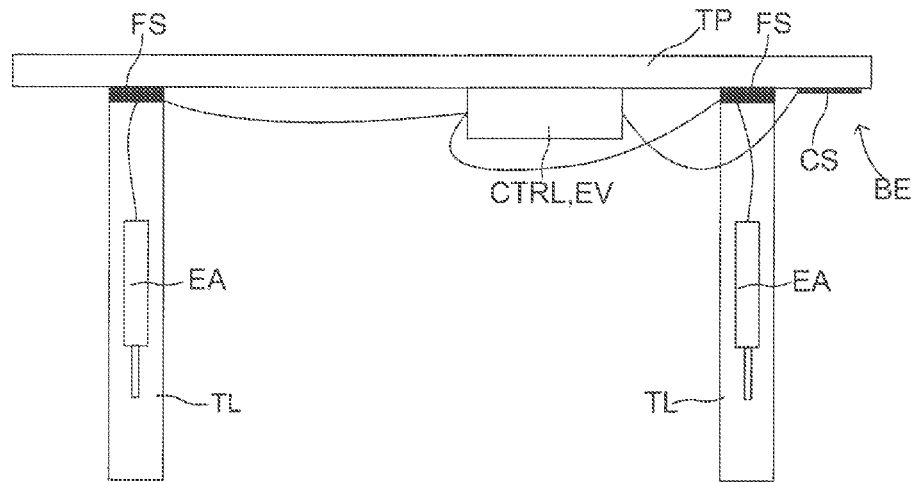
Figure 4:
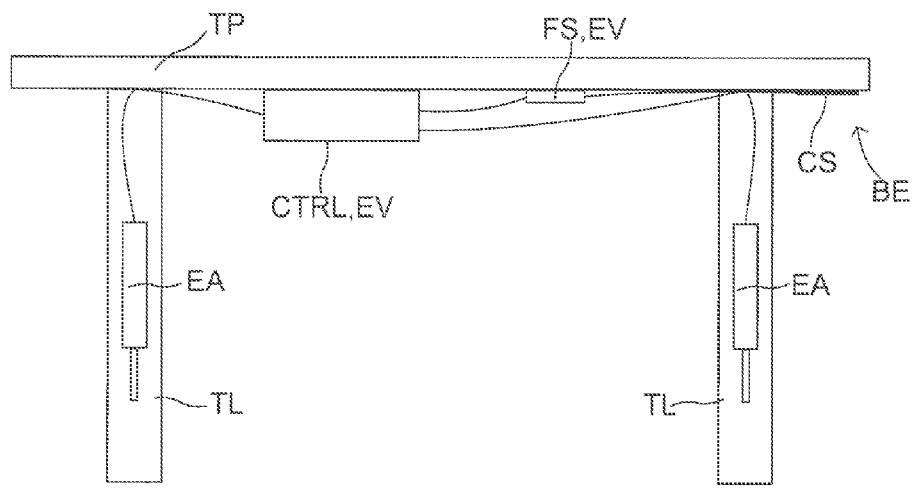
Figure 5:
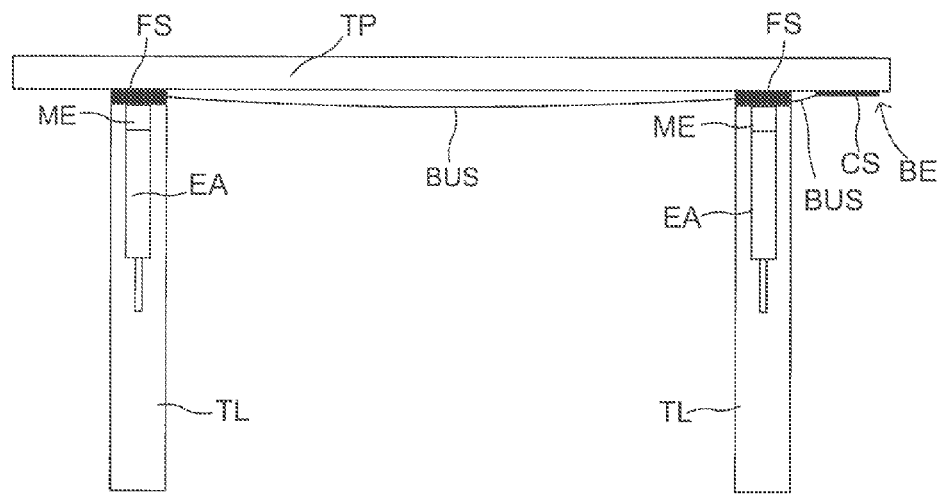
Figure 6:
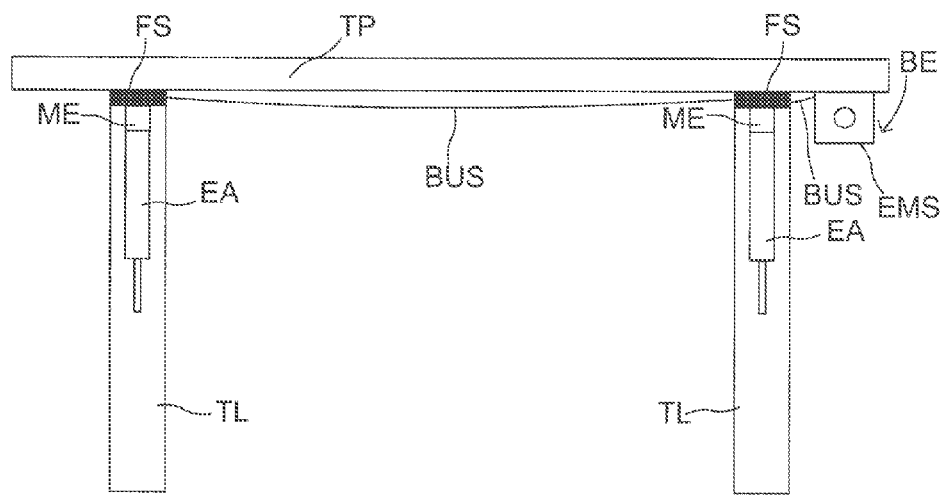
Figure 9:
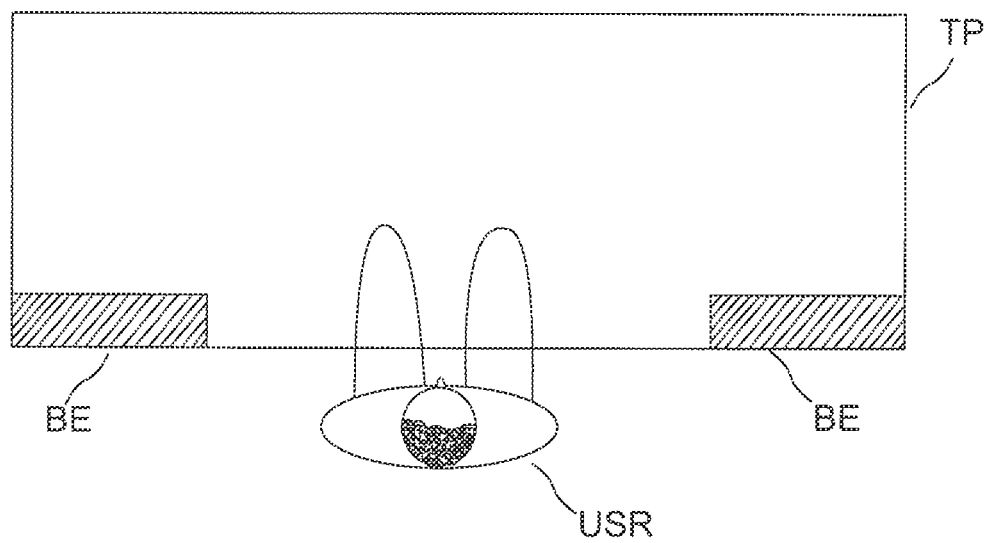

In the drawings:

FIG. 1 shows an embodiment of an electrically height-adjustable table,

FIG. 2 shows a further embodiment of an electrically height-adjustable table, FIG. 3 shows a further embodiment of an electrically height-adjustable table, FIG. 4 shows a further embodiment of an electrically height-adjustable table, FIG. 5 shows a further embodiment of an electrically height-adjustable table, FIG. 6 shows a further embodiment of an electrically height-adjustable table, FIG. 7 shows a detail of an embodiment of an operating device having a touch sensitive sensor, FIG. 8 shows a further embodiment of an operating device having a touch sensitive sensor, and FIG. 9 shows an example of a plan view onto a tabletop having the actuating elements.

FIG. 1 shows an embodiment of an electrically height-adjustable table having a tabletop TP, and two table legs TL, in each of which an electrical drive EA is provided. The table further comprises a housing having a controller CTRL for controlling the drives EA, an evaluation circuit EV, a force sensor FS, and an actuating element BE designed as an electromechanical switch EMS.

The electrical drives EA are shown only symbolically and represent, for example, a known telescoping drive, which is arranged inside the table legs TL and can effect the height adjustment of the tabletop TP.

A load, in particular a bending of the tabletop TP, can be detected by means of the force sensor FS, which is designed in particular as a strain gage or as a force-dependent resistor. The evaluation circuit EV is designed to detect an actuation of the actuating element BE while a height adjustment of the tabletop TP is blocked. The evaluation circuit EV additionally receives measurement values from the force sensor FS in a predetermined period of time after the detected actuation and determines a force alteration value, in particular an absolute alteration of force and/or a force gradient, from the received measurement values. If the force alteration value is greater than a threshold value, a control signal is output by the evaluation circuit EV to the controller CTRL and initiates a height adjustment of the tabletop TP in one of two directions. The direction depends on a sign of the force alteration value. For example, the evaluation circuit EV is designed to output a control signal having speed information for the height adjustment to the controller CTRL, wherein the speed information depends on a magnitude of the force measured by the force sensor FS. The speed information can be varied during the period, based on a measured instantaneous force. In various embodiments, no electric power is supplied to the motors of the drives EA during the described blocking of the height adjustment. Instead of that, mechanical blocking by means of a mechanical brake, a retaining element or the like can be performed, for example. It is likewise possible that the height adjustment exists solely by a self-locking of the electrical drives EA, if the drives are not being supplied with current or voltage.

In alternative embodiments, the height adjustment can also be blocked by supplying electrical power to the motors. In such a design, for example, it would be moved solely by the forces acting on the tabletop TP without supply of electrical power, so that the height adjusts itself downward so to speak, due to specially selected self-locking of the drive EA for example. By supplying electric power, however, the tabletop TP is held suspended with appropriate regulation, so that no height adjustment takes place even if force acts on the tabletop TP.

The evaluation circuit EV is designed in some configurations to output the control signal with speed information for the height adjustment, for example. The speed information depends on a magnitude of the force measured by the force sensor FS. In particular, the speed for the height adjustment can be adjusted, depending on the force applied to the tabletop TP, within a predetermined framework of a minimal speed and a maximal speed. The speed or the speed information can preferably vary during a process of a height adjustment, if the measured force during the height adjustment changes.

For some applications it can be desired to clearly signal to a user that a force-controlled height adjustment can be instantaneously initiated. For that purpose, appropriate signaling means can be provided, which indicate the detected actuation of the actuating element BE. The signaling can be visual, e.g. by means of a light element or a light rod mounted in the tabletop TP or on the tabletop TP. Alternatively or additionally, the signaling can also be acoustic. Such a signaling can also be correspondingly triggered by the evaluation circuit EV. Such signaling means are not shown for reasons of clarity, but can be integrated into the actuating element BE or mounted on the actuating element BE, for example.

FIG. 2 shows an additional embodiment of a table, which corresponds substantially to that of FIG. 1 but differs by a different design of the force sensor FS. In the embodiment of FIG. 2, force sensors FS, which are mounted on or in a part carrying or supporting the tabletop, are provided in each table leg TL. The force sensors can also be designed as pressure sensors, in particular as piezo-based sensors, which are provided for mounting on or in a part of the table supporting the tabletop. The design as a force-dependent resistor is also possible in a load-bearing part of the table. Otherwise, the operation, particularly that of the evaluation circuit EV, corresponds to the operation described in FIG. 1.

FIG. 3 shows an additional embodiment of a height-adjustable table, which corresponds substantially to the embodiment of FIG. 2. The operating element BE in this embodiment is designed as a touch-sensitive sensor, in particular a capacitive sensor CS. Accordingly, if a user would like to adjust the tabletop, he must actuate the touch-sensitive sensor, by touching it for example, and then exert force on the tabletop, wherein the operation of the evaluation circuit EV corresponds to the previous embodiments.

FIG. 4 shows an additional embodiment a table, which resembles the previously described embodiments. Here the force sensor FS and the evaluation circuit EV are mounted in a common housing on the tabletop TP and are electrically connected to the controller CTRL. In addition, an electrical contact exists between the touch sensitive sensor CS and the evaluation circuit EV. Accordingly, a conventional controller can be used as a controller for example, while the evaluation circuit EV is connected to an operating terminal of the controller CTRL in place of an ordinary operating part such as a manual switch.

FIG. 5 shows another embodiment of an electrically height-adjustable table, in which a separate controller CTRL is dispensed with, and an evaluation of control signals as well as the function of the evaluation circuit EV are performed by a motor electronics unit ME. For this purpose, the operating element BE designed as a capacitive sensor CS and the two motor electronics units ME as well as the force sensors FS are connected to one another via a bus system BUS. The height adjustment of the table is operated as previously described by actuating the actuating element BE, or touching the capacitive sensor CS, and subsequent force exertion on the tabletop TP.

FIG. 6 shows an additional embodiment of an electrically height-adjustable table, which is based substantially on the embodiment described in FIG. 5. In this case, the capacitive sensor CS is merely replaced by an electromechanical switch EMS as the actuating element. Otherwise, the operation is unchanged.

FIG. 7 shows a detail of an operating device having a capacitive sensor CS integrated into the tabletop TP. The tabletop TP comprises a panel core CM as well as an upper and lower coating CT, implemented as a veneer or plastic coating, for example. On the underside, the capacitive sensor CS is formed as a conductive surface between the coating CT and the panel core CM. In addition, a housing HS, which comprises a circuit board PCB, such as the controller CTRL or the evaluation circuit EV for example, is mounted underneath the tabletop. The housing HS and the circuit board PCB are mounted via a screw connection SV on the tabletop TP. In particular, an electrical contact between the circuit board PCB and the conductive surface is established by means of the screw connection, so that it is possible to do without additional cables or the like.

FIG. 8 shows a variation of the embodiment according to FIG. 7, in which the conductive surface is applied on the outside to the lower coating CT of the tabletop TP. Here as well, a simple electrical contact between the circuit board PCB and the conductive surface is established by means of the screw connection.

The different possibilities for variation with the elements described in connection with FIGS. 1-8 can, of course, be combined with one another as desired.

FIG. 9 shows a plan view of a tabletop with areas indicated by crosshatching, in which the actuating element or elements are advantageously arranged. In particular, the crosshatched areas are outside a sitting area of the tabletop, in front of which a user sits, which prevents an unintended actuation of the actuating elements or at least makes it more difficult.

In the previously described embodiments, the force sensor can also be used for other purposes, for example detecting a collision, so that no additional material expense is incurred under certain circumstances. In addition, force sensors such as strain gages, piezo sensors or force-dependent resistors can detect very low changes of force in table systems, even when they are stationary. In order to prevent undesired movement or release of the tabletop, the measurement values of the force sensor or sensors are preferably detected and/or evaluated only within a defined time range after actuation of the actuating element, and can therefore only lead to a height adjustment of the tabletop in this period of time.

The invention claimed is:

1. An operating device for an electrically height-adjustable table having at least one electrical drive for a height adjustment of a table top of the table, and a controller coupled to the drive for controlling the drive, the operating device comprising
    an actuating element to be arranged in the region of the tabletop;
    a force sensor that is designed to measure a force acting on the tabletop; and
    an evaluation circuit that is coupled to the force sensor and that is designed:
        to detect an actuation of the actuating element while the height adjustment of the tabletop is blocked, in particular, mechanically blocked;
        to receive measurement values from the force sensor in a predetermined period of time after the detected actuation;
        to determine a force alteration value from the received measurement values; and
        if the force alteration value is greater than a threshold value, to output a control signal to the controller, the signal initiating the height adjustment of the tabletop in a direction that depends on a sign of the force alteration.

2. The operating device of claim 1, in which no electric power is applied to a motor of the drive during the blocking of the height adjustment.

3. The operating device of claim 1, in which the force sensor is designed to measure a force acting between the drive and the tabletop.

4. The operating device of claim 1, further comprising an additional actuating element to be arranged in the area of the tabletop, wherein the evaluation circuit is designed to initiate a height adjustment of the tabletop only if actuation of both actuating elements is detected during the blocking of the height adjustment of the tabletop.

5. The operating device of claim 1, in which the evaluation circuit is designed to output a control signal having speed information for the height adjustment, wherein the speed information depends on a magnitude of the force measured by the force sensor.

6. The operating device of claim 1, in which the evaluation circuit is designed to output the control signal for height adjustment to the controller only for as long as an actuation of the actuating element is detected.

7. The operating device of claim 1, wherein the actuating element comprises a touch-sensitive sensor or a capacitive sensor.

8. The operating device of claim 7, in which the touch-sensitive sensor or the capacitive sensor, respectively, is formed by a conductive area, in particular made from a conductive paint.

9. An electrically adjustable table comprising an operating unit according to claim 8, the at least one electrical drive for height adjustment of the tabletop, and the controller coupled to the drive for controlling the drive, wherein the conductive surface is arranged on a surface of the tabletop or under a coating of the tabletop, particularly a coating made of plastic or veneer.

10. The table of claim 9, wherein the evaluation circuit is mounted via a screw connection on the tabletop, wherein an electrical connection between the evaluation circuit and the conductive surface is established via the screw connection, in particular established exclusively thereby.

11. A drive system for an electrically height-adjustable table, the drive system comprising an operating device according to claim 1, the at least one electrical drive for height adjustment of the tabletop of the table, and the controller coupled to the drive for controlling the drive, wherein the drive has a motor electronics unit arranged on the motor of the drive and comprising the controller and the evaluation circuit.

12. The drive system of claim 11, in which the motor electronics unit, the actuating element and the force sensor are connected to one another via a bus system.

13. The operating device of claim 1, wherein the force alteration value is an absolute force alteration or a force gradient.

14. A method for adjusting the height of a table top of a table having an actuating element arranged in the region of the tabletop, and a force sensor that is designed to measure a force acting on the tabletop, the method comprising:
- detecting an actuation of the actuating element while a height adjustment of the tabletop is blocked, more particularly mechanically blocked;
- receiving measurement values from the force sensor in a predetermined period of time after the detected actuation;
- determining a force alteration value from the received measurement values; and
- if the force alteration value is greater than a threshold value, performing a height adjustment of the tabletop in a direction that depends on a sign of the force alteration value.

15. The method of claim 14, wherein no electric power is applied to a motor of the drive during the blocking of the height adjustment.

16. The method of claim 14, wherein the force sensor measures a force acting between the drive and the tabletop.

17. The method of claim 14, wherein the table has an additional actuating element arranged in the region of a tabletop, and wherein the height of the tabletop is adjusted only if an actuation of both actuating elements is detected during the blocking of the height adjustment of the tabletop.

18. The method of claim 14, wherein the height adjustment of the tabletop is performed at a speed that depends on a magnitude of the force measured by the force sensor.

19. The method of claim 14, wherein the height of the tabletop is adjusted only as long as an actuation of the actuating element is detected.

20. The method of claim 14, wherein the force alteration value is an absolute force alteration or a force gradient.

* * * * *